United States Patent
Tanaka-Wissel et al.

(10) Patent No.: US 11,318,823 B2
(45) Date of Patent: May 3, 2022

(54) ROOF SYSTEM FOR A VEHICLE, VEHICLE WITH SUCH A ROOF SYSTEM, ROOF ELEMENT AND PRODUCTION METHOD

(71) Applicant: Bayerische Motoren Werke Aktiengesellschaft, Munich (DE)

(72) Inventors: Geoffrey Tanaka-Wissel, Munich (DE); Alexander Walter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 351 days.

(21) Appl. No.: 16/382,861

(22) Filed: Apr. 12, 2019

(65) Prior Publication Data

US 2019/0315207 A1    Oct. 17, 2019

(30) Foreign Application Priority Data

Apr. 13, 2018  (DE) .......................... 10 2018 205 683

(51) Int. Cl.
| | | |
|---|---|---|
| *B60J 7/043* | (2006.01) | |
| *B60R 21/04* | (2006.01) | |
| *E05F 15/655* | (2015.01) | |

(52) U.S. Cl.
CPC ............. *B60J 7/0435* (2013.01); *B60R 21/04* (2013.01); *E05F 15/655* (2015.01);
(Continued)

(58) Field of Classification Search
CPC .... B60R 2021/0414; B60R 2021/0442; B60R 21/04; E05Y 2900/542; B60J 7/043; B60J 7/0435; E05F 15/655
(Continued)

(56) References Cited

U.S. PATENT DOCUMENTS

| | | | | |
|---|---|---|---|---|
| 6,264,238 B1* | 7/2001 | MacDonald | ............ | B60R 21/04 280/751 |
| 8,075,050 B2* | 12/2011 | Hotta | ..................... | B60J 7/0573 296/223 |
| 8,091,953 B2* | 1/2012 | Fukui | .................. | B60R 13/0231 296/187.05 |

(Continued)

FOREIGN PATENT DOCUMENTS

| | | | |
|---|---|---|---|
| DE | 100 62 156 A1 | | 6/2002 |
| DE | 10 2005 046 901 A1 | | 4/2007 |

(Continued)

OTHER PUBLICATIONS

German language Search Report issued in counterpart German Application No. 10 2018 205 683.8 dated Feb. 4, 2019 with partial English translation (15 pages).

*Primary Examiner* — Hilary L Gutman
(74) *Attorney, Agent, or Firm* — Crowell & Moring LLP

(57) ABSTRACT

A roof system for a vehicle includes a fixed roof element, forming a fixed roof segment of a vehicle roof bounding a passenger compartment and situated in a rear area of the vehicle roof, a roof opening and closing mechanism, which allows a relative movement of a movable roof element in relation to the fixed roof element and/or a relative movement of a movable roller blind in relation to the vehicle roof. The fixed roof element is designed as a single-piece roof element having at least one impact energy absorption section and at least one receiving section locally distinct from the impact energy absorption section for receiving electrical and/or mechanical function elements, by which or in the interplay of which with other function elements a movement of the movable roof element for opening and closing of the roof opening and/or driving the roller blind can be effectuated.

11 Claims, 6 Drawing Sheets

(52) U.S. Cl.
CPC ............... *B60R 2021/0414* (2013.01); *B60R 2021/0442* (2013.01); *E05Y 2900/542* (2013.01)

(58) Field of Classification Search
USPC ........................................................ 296/214
See application file for complete search history.

(56) References Cited

U.S. PATENT DOCUMENTS

| | | | | |
|---|---|---|---|---|
| 10,974,575 | B2* | 4/2021 | Mueller | B60J 1/2063 |
| 10,974,579 | B2* | 4/2021 | Mueller | B60J 7/067 |
| 2005/0168015 | A1* | 8/2005 | Davey | B60R 13/0225 |
| | | | | 296/214 |
| 2012/0049569 | A1* | 3/2012 | Chickmenahalli | B60R 21/04 |
| | | | | 296/187.05 |
| 2014/0084636 | A1* | 3/2014 | Wimmer | B29C 45/1418 |
| | | | | 296/216.07 |
| 2016/0082901 | A1 | 3/2016 | Bock et al. | |
| 2017/0174060 | A1* | 6/2017 | Nania | B60J 7/0435 |

FOREIGN PATENT DOCUMENTS

| | | | |
|---|---|---|---|
| DE | 10 2006 045 274 A1 | 4/2008 | |
| DE | 10 2011 051 703 A1 | 3/2012 | |
| DE | 102011014989 A1 * | 9/2012 | ....... B29C 45/14467 |
| DE | 10 2014 218 730 A1 | 3/2016 | |
| DE | 10 2016 125 284 A1 | 6/2018 | |
| EP | 2 664 473 B1 | 3/2016 | |
| JP | 2019014273 A * | 1/2019 | ............... B60Q 3/51 |

* cited by examiner

ROOF SYSTEM FOR A VEHICLE, VEHICLE WITH SUCH A ROOF SYSTEM, ROOF ELEMENT AND PRODUCTION METHOD

CROSS REFERENCE TO RELATED APPLICATION

This application claims priority under 35 U.S.C. § 119 from German Patent Application No. 10 2018 205 683.8, filed Apr. 13, 2018, the entire disclosure of which is herein expressly incorporated by reference.

BACKGROUND AND SUMMARY OF THE INVENTION

The invention relates to a roof system for a vehicle, especially for a motor vehicle. Furthermore, the invention relates to a vehicle with such a roof system, a corresponding roof element of such a roof system, and a production method for such a roof element.

In conventional roof systems for vehicles, designs with roof opening systems are widely known.

One example of a conventional roof opening system is the sliding roof for motor vehicles, in which a movable roof element functioning as an often transparent cover can be moved underneath the roof skin in order to form or free up an opening in a vehicle roof.

Further examples are so-called panoramic roof opening systems, in which a large portion of the vehicle roof is formed by transparent roof elements, while generally one of the roof elements is formed as a movable roof element, being in front in the vehicle longitudinal direction, and can be moved above or underneath a fixed roof element at the rear in the vehicle longitudinal direction. The fixed roof element is formed for example as a fixed roof segment of the vehicle roof bounding a passenger compartment and is situated in a rear area of the vehicle roof near the rear window.

In order to realize the movement of the movable roof element, usually a roof opening and closing mechanism is provided in the form of a mechanism which is designed to allow a relative movement of the movable roof element in relation to the fixed roof element for the opening and closing of the roof opening in the vehicle roof and a relative movement of a movable roller blind in relation to the vehicle roof.

In connection with such panoramic roof opening systems, a so-called panoramic roof cassette is provided, having the sole function of receiving drive units for the moving of the movable roof element. In order to provide adequate passenger protection for a head impact in event of a vehicle crash or some other circumstances, impact energy absorbers separate from the panoramic roof cassette are provided in the area of the ceiling of the vehicle roof. However, the providing of the panoramic roof cassette and the separate impact energy absorbers requires increased design space, which results in less head room in the passenger compartment, at least in the rear area.

Thus, there exists a certain conflict of goals in the design of such roof opening systems between a sporty exterior look, an outer roof skin with total glass optics, an ergonomic head room for vehicle passengers, a design space for energy absorption, as well as a design space for the functionality of the roof opening system.

Furthermore, depending on the national legal regulations, harsher demands are being placed to an increasing extent on the passive vehicle safety in connection with the protection measures in potential head impact areas in the vehicle exterior and interior. For example, this includes in particular the demands on head impact in the interior according to U.S. guidelines, such as FMVSS201u, which is relevant to the approval of motor vehicles in the USA.

Therefore, the problem which the invention proposes to solve is to modify the roof systems, vehicles, roof elements and production methods of this kind in such a way that an opening function of the vehicle roof can be achieved with reduced design space, taking into account passenger protection.

The roof system according to the invention is intended for a vehicle, especially for a motor vehicle, and it comprises a fixed roof element and a roof opening and closing mechanism. The fixed roof element is formed as a roof segment of a vehicle roof bounding a passenger compartment and is situated in a rear area of the vehicle roof. The roof opening and closing mechanism is designed to allow a relative movement of a movable (at front in the driving direction) roof element in relation to the fixed (at rear in the driving direction) roof element for the opening and closing of a roof opening in the vehicle roof and/or a relative movement of a movable roller blind in relation to the vehicle roof, wherein the fixed roof element is designed as a single-piece roof element having at least one impact energy absorption section and at least one receiving section locally distinct from the impact energy absorption section for receiving of electrical and/or mechanical function elements, by which or in the interplay of which with other function elements a movement of the movable roof element for the opening and closing of the roof opening and/or a driving of the roller blind can be effectuated.

According to the invention, the fixed roof element thus takes on at least two basic functions. On the one hand, the impact energy absorption function, for example, by way of an integrated rib structure interacting with a deformation plate for distributing the load onto the integrated rib structure in the area of the head impact. On the other hand, the fixed roof element takes on a receiving function for receiving of drive units for the sliding roof drive. Since both functions according to the invention are realized in a single-piece component, a reduced design space is achieved, while passenger protection requirements in event of a head impact can be satisfied and assembly tolerances can be limited due to a smaller number of components.

The roof system according to the invention can be modified in such a way that the receiving section receives one or more of the following function elements:
an electric motor for moving the movable roof element for opening and closing the roof opening, and/or
an electrical line for the electrical actuating of the electric motor, and/or
a Bowden cable or a pigtail for the mechanical driving of the movable roof element, and/or
a Bowden cable guide or a pigtail guide for guiding the Bowden cable or the pigtail for the mechanical driving of the movable roof element, and/or
a Bowden cable or a pigtail for the mechanical driving of the roller blind, and/or
an electric motor for driving the roller blind, and/or
an electrical line for the electrical actuating of the electric motor for driving the roller blind.

Moreover, the roof system according to the invention can be implemented in such a way that the impact energy absorption section comprises an energy absorbing structure for absorption of an impact energy of a head, especially a rib absorber structure.

Furthermore, the roof system according to the invention can be configured in such a way that a deformation plate is connected to the impact energy absorption section in such a way that energy taken up by the impact energy of the head is transmitted to predetermined connection points between the deformation plate and the impact energy absorption section in a distributed manner from the deformation plate to the impact energy absorption section.

Moreover, the roof system according to the invention can be realized in such a way that the deformation plate is connected via the connection points on one side of the fixed roof element to the fixed roof element and the impact absorption section is formed on the other side of the fixed roof element.

The deformation plate thus serves for distributing the load among the energy-absorbing ribs and is to be provided especially in regard to the legal regulation FMVSS201u. According to this, a large area of the ceiling is bombarded with a test body, and predefined limit values must be observed on the entire bombarded surface. This is accomplished by the deformation plate, which also brings about a distributing of the load on the rib absorber structure in places where no rib absorber structure is provided; this is because the roof element cannot be filled completely with the rib absorber structure, since the roof element also receives the electromechanical function elements, besides the rib absorber structure. For example, the deformation plate is fastened by use of three screws to the roof system and is produced as a stamped part.

Moreover, the roof system according to the invention can be realized in such a way that the single-piece roof element comprises several impact energy absorption sections and/or several receiving sections.

Furthermore, the roof system according to the invention can be modified in such a way that the single-piece roof element comprises at least two impact energy absorption sections and one receiving section situated between the impact energy absorption sections.

Furthermore, the roof system according to the invention can be configured in such a way that the single-piece roof element is a plastic component produced by injection molding. Preferably, the single-piece roof element on account of its multiple functions in only a single component is an injection molded plastic component, such as a fiberglass reinforced PP component or a fiberglass reinforced polypropylene component.

Furthermore, the roof system according to the invention can be implemented in such a way that the single-piece roof element and the deformation plate are arranged between a glass roof outer skin and a ceiling lining.

The motor vehicle according to the invention comprises the roof system according to the invention.

The roof element according to the invention is intended for a roof system for a vehicle, especially for a motor vehicle, wherein the roof element is designed as a fixed roof element, which when mounted as intended in the vehicle forms a fixed roof segment of a vehicle roof bounding a passenger compartment and situated in a rear area of the vehicle roof. The fixed roof element is designed as a single-piece roof element having at least one impact energy absorption section and at least one receiving section locally distinct from the impact energy absorption section for receiving of electrical and/or mechanical function elements, by which or in the interplay of which with other function elements a movement of a movable roof element for the opening and closing of the roof opening and/or a driving of the roller blind can be effectuated.

This brings about the qualities and/or benefits as explained in connection with the roof system according to the invention in the same or similar manner, and so reference is made to the foregoing remarks in connection with the roof system according to the invention in order to avoid repetition.

The method according to the invention for producing a roof element for a roof system for a vehicle, especially for a motor vehicle, involves the following steps: forming of the roof element as a single-piece roof element, which when mounted as intended in the vehicle forms a fixed roof segment of a vehicle roof bounding a passenger compartment and is situated in a rear area of the vehicle roof, wherein the fixed roof element has at least one impact energy absorption section and at least one receiving section locally distinct from the impact energy absorption section for receiving of electrical and/or mechanical function elements, by which or in the interplay of which with other function elements a movement of a movable roof element for the opening and closing of a roof opening and/or a driving of the roller blind can be effectuated.

This brings about the qualities and/or benefits as explained in connection with the roof system according to the invention in the same or similar manner, and so reference is made to the foregoing remarks in connection with the roof system according to the invention in order to avoid repetition.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
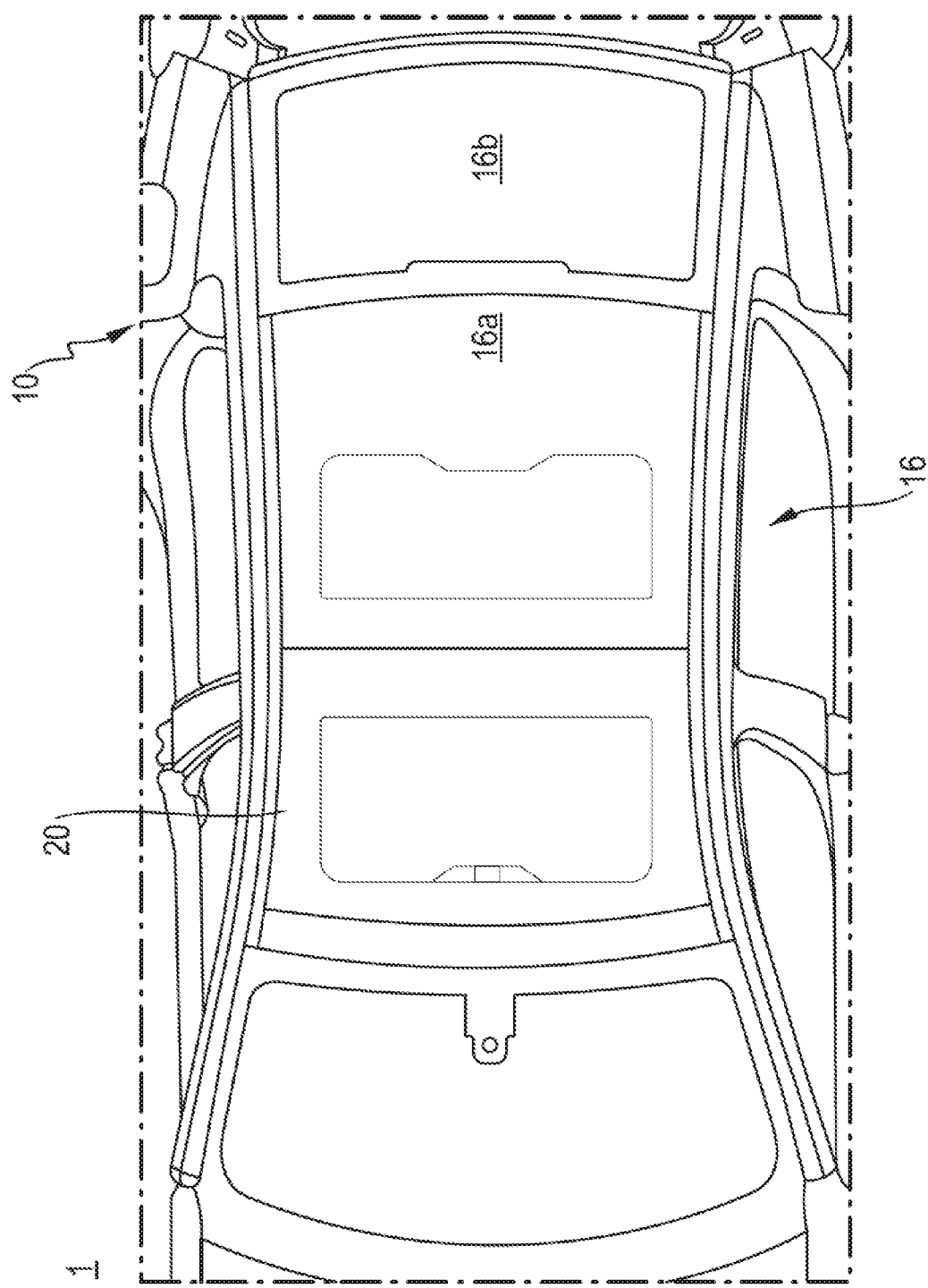
FIG. 1 is a schematic representation of a vehicle according to the invention, which is outfitted with a roof system according to an embodiment of the invention, in a top view.
Figure 2:
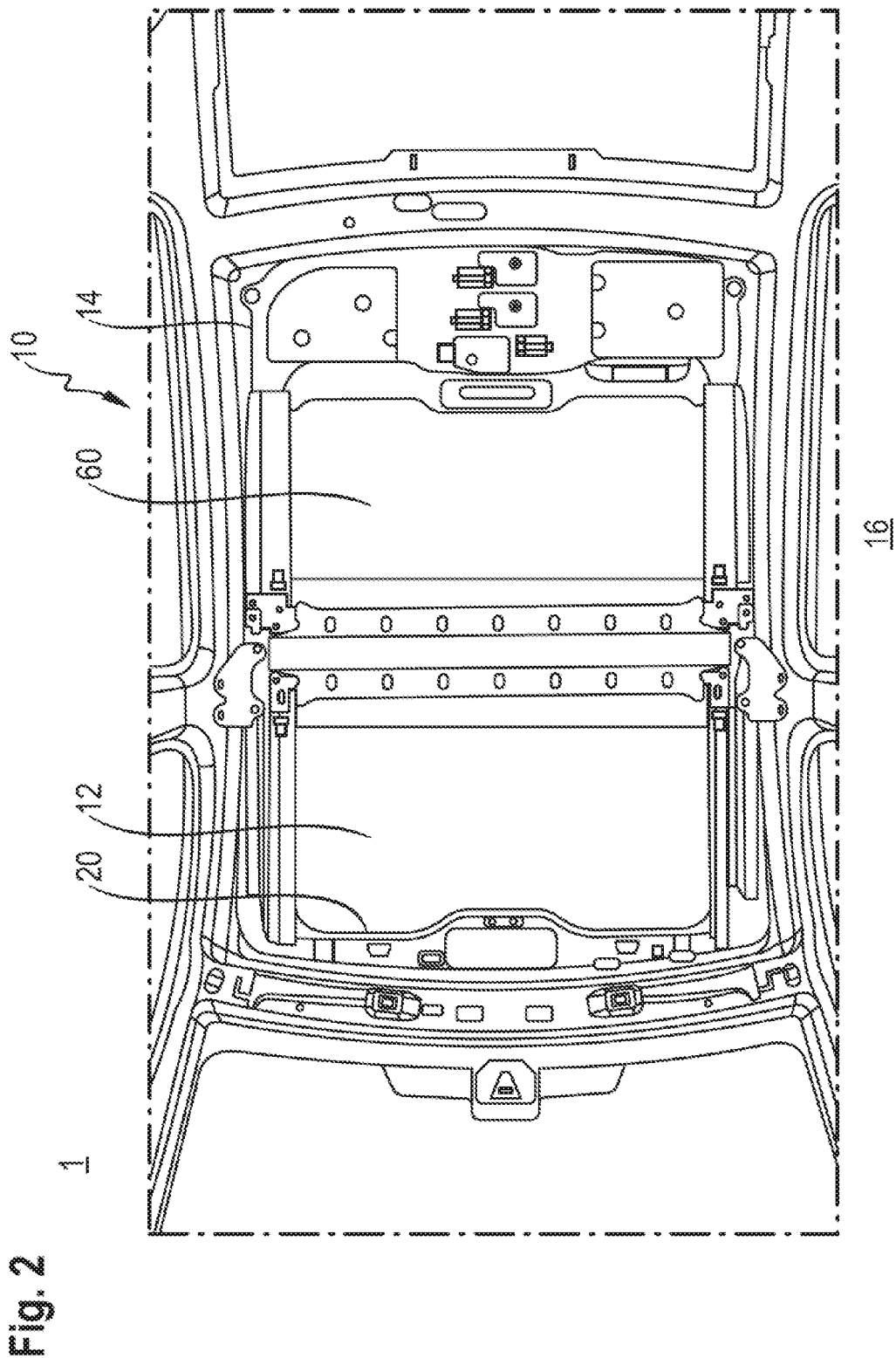
FIG. 2 is a schematic representation of the roof system of FIG. 1 in enlarged and partly broken open view.

FIG. 1 shows a schematic representation of a vehicle 1, which is outfitted with a roof system 10, in a top view, while FIG. 2 shows a schematic representation of the roof system 10 of FIG. 1 in an enlarged and partly broken open view.

As is evident from FIGS. 1 and 2, the vehicle 1, which in this exemplary embodiment is a motor vehicle, includes the roof system 10.

The roof system 10 has, among other things, a fixed roof element 14, at the rear in the vehicle longitudinal direction, which forms a fixed roof segment of a vehicle roof 16 bounding a passenger compartment and is situated in a rear area 16a of the vehicle roof 16, near or adjacent to a rear window 16b, as can be seen in FIGS. 1 and 2.

Figure 7:
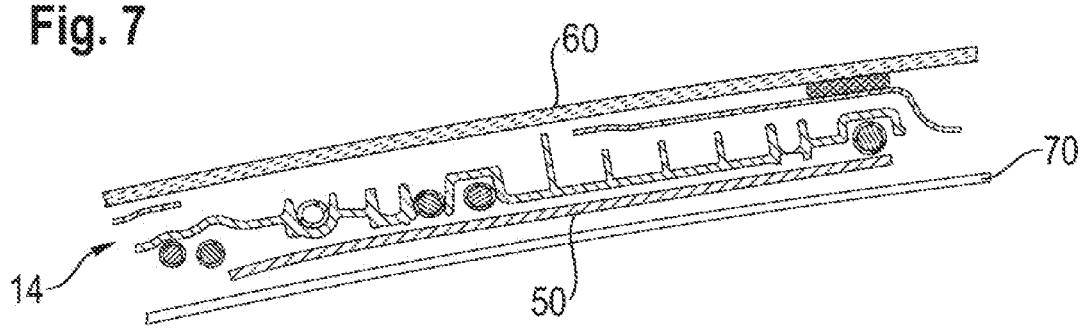
FIGS. 7 and 8 are various schematic sectional views through the roof element in FIGS. 3 and 4.
Figure 8:
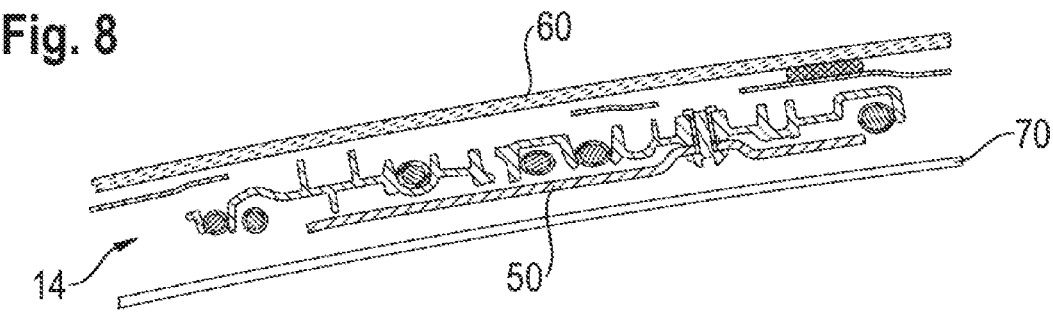

Furthermore, the roof system 10 has a roof element 12, at the front in the vehicle longitudinal direction, that is movable in relation to the fixed roof element 14, which is thus provided for the opening and closing of a roof opening 20 in the vehicle roof 16 by way of a relative movement in relation to the fixed roof element 14. In this exemplary embodiment, the movable roof element 12 is a glass roof element of a panoramic sliding roof of the vehicle 1. Moreover, the roof system 10 comprises a roof element 60 forming a glass outer skin, being situated above the fixed roof element 14, as well as an inner lining element, situated beneath the fixed roof element 14, which forms part of an inner lining 70 of the roof ceiling of the passenger compartment, as can be seen in FIGS. 7 and 8.

The fixed roof element 14 in this exemplary embodiment is formed as a single-piece roof element. In particular, the fixed roof element 14 is a plastic component made by injection molding, which is connected via fastenings (not described in detail) to body-side support elements or support structures, such as in the area of the C-column. In particular, the fastening of the roof element 14 is formed by a tolerance-equalizing screwing in an upper frame piece, which is bonded/welded to a body shell structure in the area of the rear column.

Furthermore, the roof system 10 comprises a roof opening and closing mechanism (not described or represented in detail), which is designed to make possible the relative movement of the movable roof element 12 in relation to the fixed roof element 14 for the opening and closing of the roof opening 20 in the vehicle roof 16. The roof opening and closing mechanism may be a conventional guide mechanism, making possible the relative movement in question.

In addition, the roof opening and closing mechanism may also allow a relative movement of a movable roller blind in relation to the vehicle roof 16, which can be drawn underneath the movable roof element 12 when the roof opening 20 is closed, in order to act as a privacy screen or sun screen.

The fixed roof element 14 is illustrated in various schematic representations in FIGS. 3 to 8.

Figure 3:
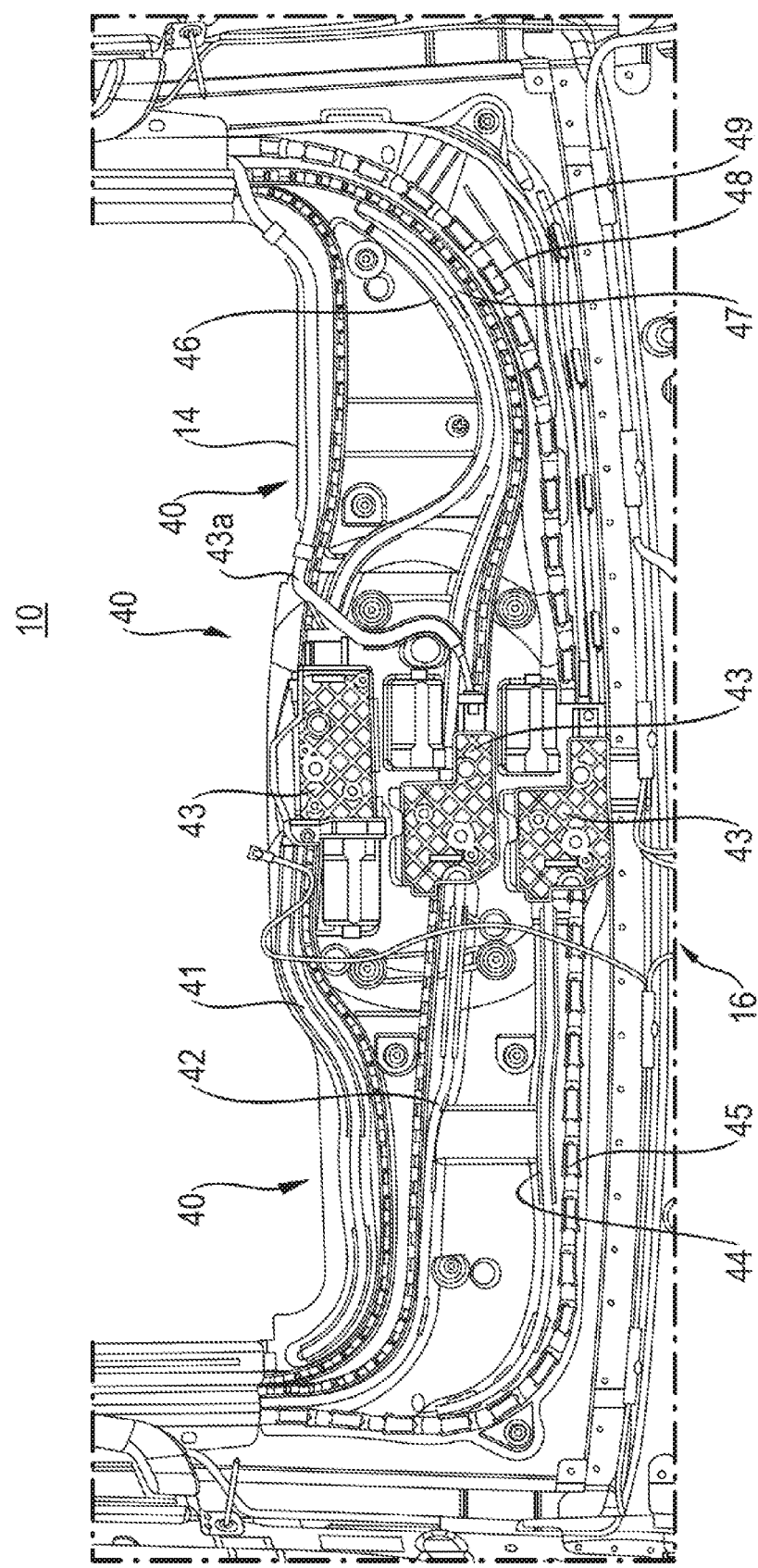
FIG. 3 is a schematic representation of a roof element according to an embodiment of the invention of the roof system in FIG. 1 in a bottom view.
Figure 4:
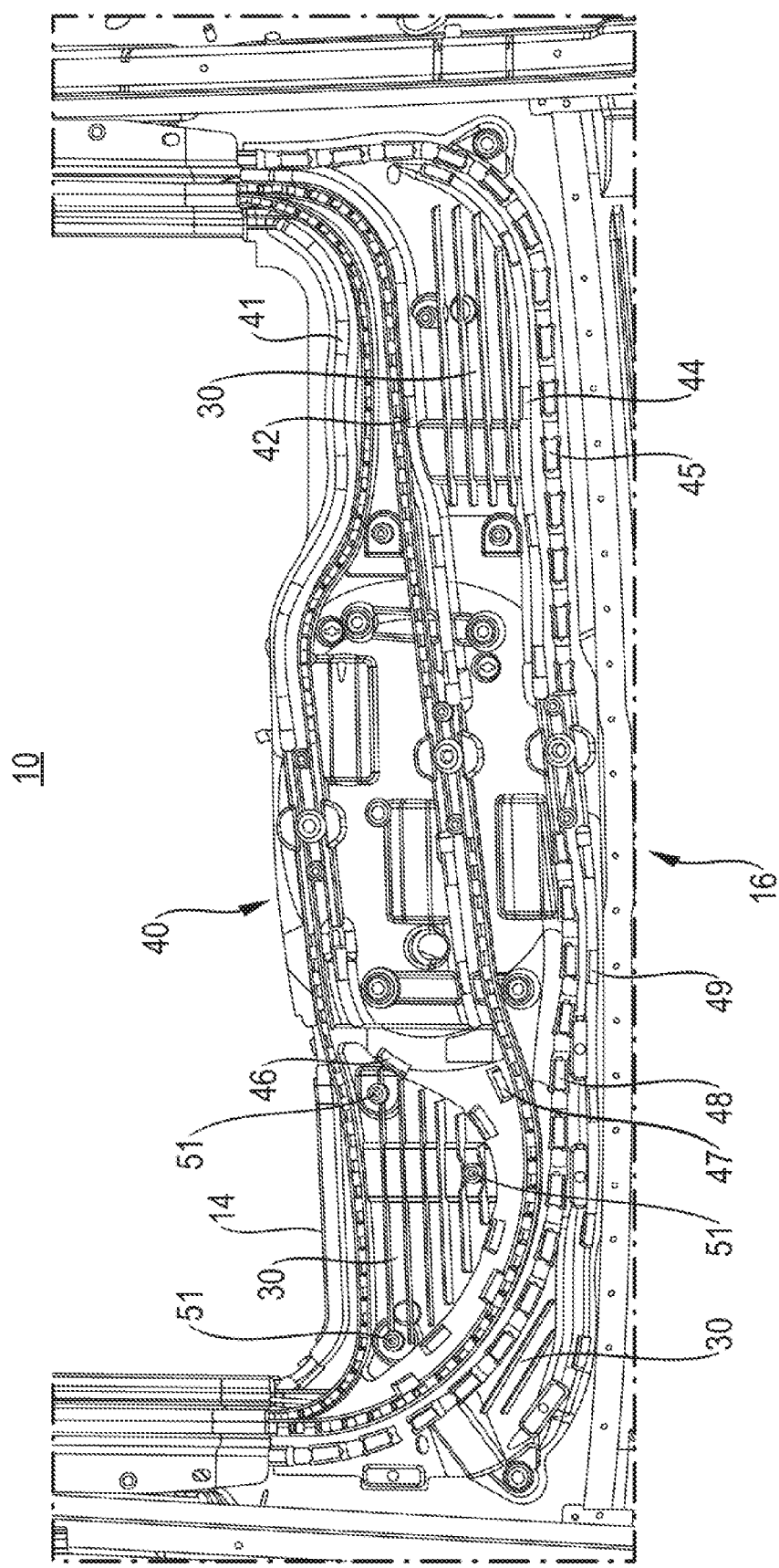
FIG. 4 is a schematic representation of the roof element according to the embodiment of the invention of the roof system in FIG. 1 in a top view.
Figure 5:
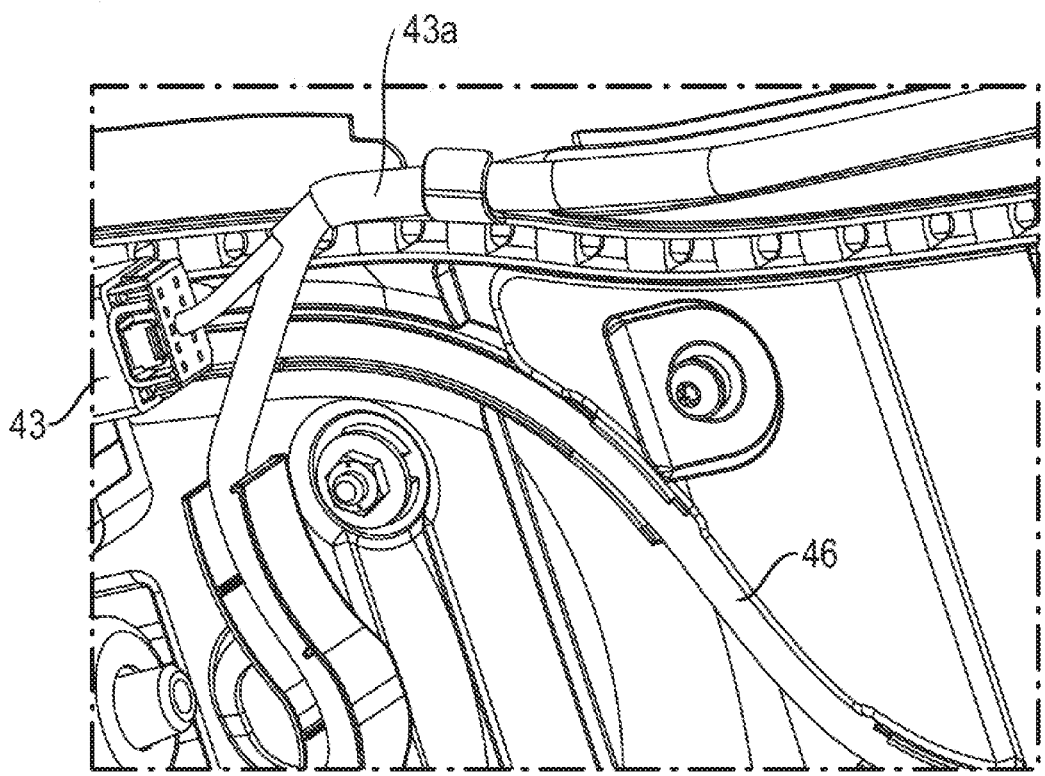
FIG. 5 is a schematic representation of a section of the roof element in FIG. 3 in an enlarged bottom view.
Figure 6:
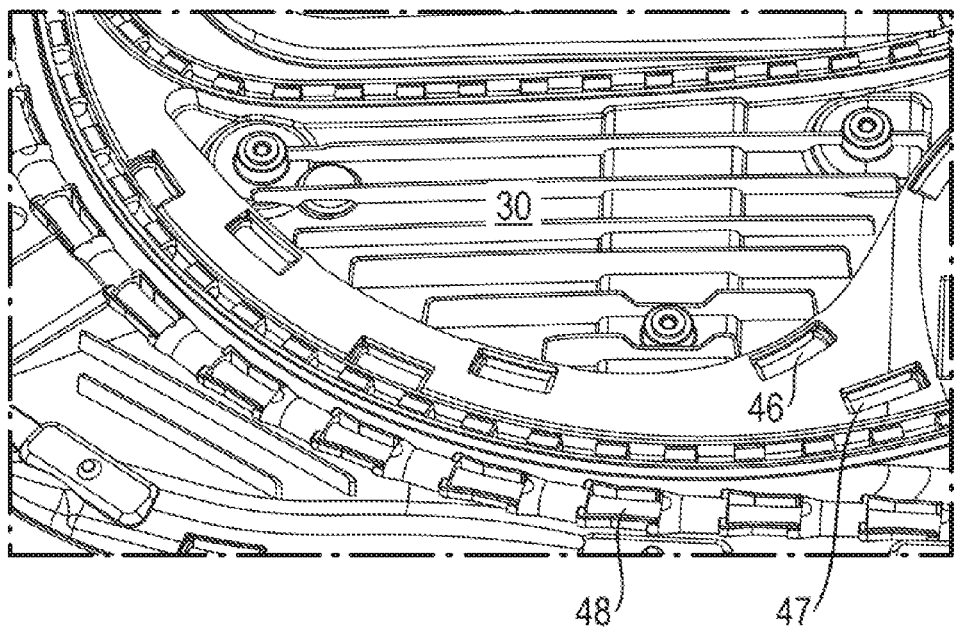
FIG. 6 is a schematic representation of a section of the roof element in FIG. 4 in an enlarged top view.

In particular, FIG. 3 shows a schematic representation of the fixed roof element 14 of FIG. 1 in a bottom view, while FIG. 4 shows a schematic representation of the fixed roof element 14 of FIG. 1 in a top view. Moreover, FIGS. 5 and 6 show schematic representations of sections of the fixed roof element 14 of FIGS. 3 and 4 in enlarged views. FIGS. 7 and 8 show various schematic sectional views through the fixed roof element 14 of FIGS. 3 and 4.

As is evident from FIGS. 3 to 8, the single-piece fixed roof element 14 comprises several functionally and locally separated partial sections 30 and 40, namely, several impact energy absorption sections 30 and several receiving sections 40 locally distinct from the impact energy absorption sections 30 to receive electrical and mechanical function elements 41-49 which will be further explained below. As is furthermore evident from FIG. 3 to 8, several impact energy absorption sections 30 and a receiving section 40 situated between the impact energy absorption sections 30 are provided on the roof element 14, among other things.

By the function elements 41-49 or in their interplay with other function elements 41-49, a movement of the movable roof element 12 for the opening and closing of the roof opening 20 and a driving of the roller blind is brought about.

The receiving sections 40 accommodate several function elements, namely, an electric motor 43 for moving the movable roof element 12 to open and close the roof opening 20, an electrical line 43a or electrical lines 43a for the electrical actuation of the electric motor 43, several Bowden cables or pigtails 44 and 49 for the mechanical driving of the movable roof element 12, several Bowden cable guides or pigtail guides 45 and 48 for guiding the Bowden cables or pigtails 44 and 49 for the mechanical driving of the movable roof element 12, a Bowden cable or a pigtail 41, 42, 46 and 47 for the mechanical driving of the roller blind, an electric motor 43 for the driving of the roller blind, an electrical line 43a or electrical lines 43a, as shown in FIG. 5, for the electrical actuation of the electric motor 43 for the driving of the roller blind. In the case of several electrical lines 43a, these may run in a single conductor strand and fan out to the individual port shortly before connecting to the respective motors.

The impact energy absorption sections 30 have only energy absorbing structures (and thus none of the aforesaid function elements 41-49) for the absorption of an impact energy of a head, in particular rib absorber structures comprising a plurality of ribs arranged alongside each other for the head impact energy absorption.

As is especially evident from FIGS. 3 and 4, the rib absorber structures may be arranged next to Bowden cables or pigtails and/or Bowden cable guides or pigtail guides for the opening and closing functions of the sliding roof and/or the roller blind. For example, Bowden cables and/or pigtails can be shoved between stiffening ribs in alternating injection-molded channels, while electrical lines such as power cables may be secured partly with clips to the stiffening ribs or clipped in partly with locking lugs molded on between the energy-absorbing ribs. Due to a suitable arrangement of the function elements, such as the laying of Bowden cables and electrical lines and suitable trimming of the roof element as the upper frame piece of the roof system (the upper frame piece has the function of receiving the motors, creating of bonding surfaces for the fixed glass area, fastening frame for the guide rails of the movable front glass piece and the roller blind), an adequate deformation path can thus be achieved.

Figure 9:
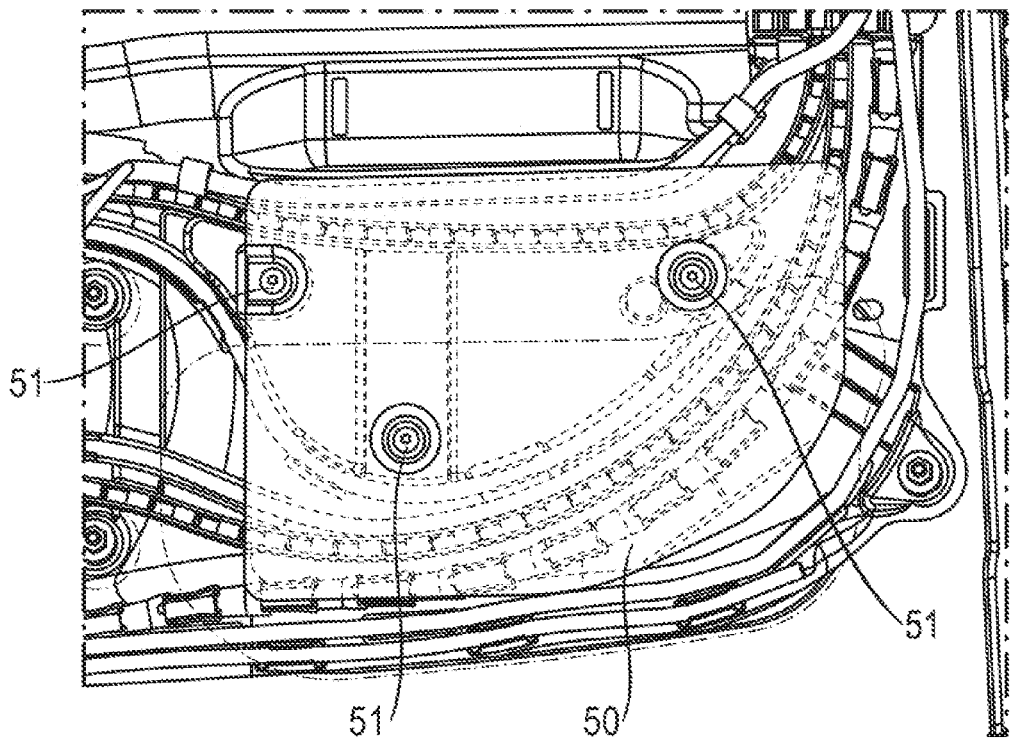
FIG. 9 is a schematic representation of the roof element with a deformation plate arranged on it.

As is furthermore evident from the figures, the rib absorber structure is provided on a top side of the single-piece fixed roof element 14. In order to channel the impact energy of the head from the underside of the single-piece fixed roof element 14 into the rib absorber structure, a deformation plate 50 is connected to an impact energy absorption section 30 in such a way that energy taken up by the impact energy of the head is transmitted to predetermined connection points 51 between the deformation plate 50 and the impact energy absorption section 30 in a distributed manner from the deformation plate 50 onto the impact energy absorption section 30. FIG. 9 shows a schematic representation of the roof element 14 with the deformation plate 50 attached to it for the load distribution, while FIGS. 7 and 8 show the deformation plate 50 in a cross-sectional view. Accordingly, a load distribution over the largest possible area into the rib absorber structure is accomplished with the aid of the rib absorber structure and the deformation plate 50 in event of a local force acting during a head impact against the deformation plate 50.

As can be seen especially in FIGS. 7 and 8, the single-piece roof element 14 and the deformation plate 50 are arranged between a glass roof outer skin 60 and a ceiling lining 70.

The method for producing the roof element 14 for the roof system for the vehicle 1 is as follows.

The roof element 14 is formed as a single-piece roof element 14 by injection molding of plastic, which forms when properly mounted in the vehicle the fixed roof segment of the vehicle roof bounding the passenger compartment and is situated in the rear area 16*a* of the vehicle roof. The fixed roof element 14 comprises the plurality of impact energy absorption sections 30 and the plurality of receiving sections 40 which are locally distinct from the impact energy absorption sections 30 to receive the electrical and/or mechanical function elements 41-49, by which or in the interplay of which with other function elements a movement of the movable roof element 12 can be accomplished for the opening and closing of the roof opening 20 and/or for the driving of the roller blind.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A roof system for a vehicle, comprising:
   a fixed roof element, which forms a fixed roof segment of a vehicle roof bounding a passenger compartment and is situated in a rear area of the vehicle roof;
   a roof opening and closing mechanism, which is configured to allow one or both of: a relative movement of a movable roof element in relation to the fixed roof element for opening and closing of a roof opening in the vehicle roof and a relative movement of a movable roller blind in relation to the vehicle roof, wherein
   the fixed roof element is a single-piece roof element having at least one impact energy absorption section and at least one receiving section locally distinct from the impact energy absorption section for receiving electrical and/or mechanical function elements, by which or in an interplay of which with other function elements a movement of the movable roof element for the opening and closing of the roof opening and/or a driving of the roller blind is effectuated,
   the impact energy absorption section comprises an energy absorbing structure for absorption of an impact energy of a head, and
   a deformation plate is connected to the impact energy absorption section such that energy taken up by the impact energy of the head is transmitted to predetermined connection points between the deformation plate and the impact energy absorption section in a distributed manner from the deformation plate to the impact energy absorption section.

2. The roof system as claimed in claim 1, wherein
   the receiving section receives one or more of the following function elements:
   an electric motor for moving the movable roof element for opening and closing the roof opening,
   an electrical line for electrical actuation of the electric motor,
   a Bowden cable or a pigtail for mechanically driving the movable roof element,
   a Bowden cable guide or a pigtail guide for guiding the Bowden cable or the pigtail for the mechanical driving of the movable roof element,
   a Bowden cable or a pigtail for mechanically driving the roller blind,
   an electric motor for driving the roller blind, and
   an electrical line for electrical actuation of the electric motor for driving the roller blind.

3. The roof system as claimed in claim 1, wherein
   the energy absorbing structure is a rib absorber structure.

4. The roof system as claimed in claim 1, wherein
   the deformation plate is connected via the connection points on one side of the fixed roof element to the fixed roof element and the impact absorption section is formed on the other side of the fixed roof element.

5. The roof system as claimed in claim 4, wherein
   the single-piece roof element and the deformation plate are arranged between a glass roof outer skin and a ceiling lining.

6. The roof system as claimed in claim 1, wherein
   the single-piece roof element comprises several impact energy absorption sections and/or several receiving sections.

7. The roof system as claimed in claim 1, wherein
   the single-piece roof element comprises at least two impact energy absorption sections and one receiving section situated between the two impact energy absorption sections.

8. The roof system as claimed in claim 1, wherein
   the single-piece roof element is a plastic injection-molded component.

9. A motor vehicle comprising a roof system as claimed in claim 1.

10. A roof element for a roof system for a vehicle, comprising:
    a fixed roof element, which when mounted as intended in the vehicle forms a fixed roof segment of a vehicle roof bounding a passenger compartment and situated in a rear area of the vehicle roof, wherein
    the fixed roof element is a single-piece roof element having at least one impact energy absorption section and at least one receiving section locally distinct from the impact energy absorption section for receiving electrical and/or mechanical function elements, by which or in an interplay of which with other function elements a movement of a movable roof element for opening and closing of the roof opening and/or a driving of a roller blind is effectuated,
    the impact energy absorption section comprises an energy absorbing structure for absorption of an impact energy of a head, and
    a deformation plate is connected to the impact energy absorption section such that energy taken up by the impact energy of the head is transmitted to predetermined connection points between the deformation plate and the impact energy absorption section in a distributed manner from the deformation plate to the impact energy absorption section.

11. A method for producing a roof element for a roof system for a vehicle, comprising the steps of:
    forming the roof element as a single-piece roof element, which when mounted as intended in the vehicle forms a fixed roof segment of a vehicle roof bounding a passenger compartment and situated in a rear area of the vehicle roof, wherein
    the fixed roof element has at least one impact energy absorption section and at least one receiving section locally distinct from the impact energy absorption section for receiving of electrical and/or mechanical function elements, by which or in an interplay of which with other function elements a movement of a movable roof element for opening and closing of a roof opening and/or a driving of a roller blind is effectuated,
    the impact energy absorption section comprises an energy absorbing structure for absorption of an impact energy of a head, and a deformation plate is connected to the impact energy absorption section such that energy taken up by the impact energy of the head is transmitted to predetermined connection points between the deformation plate and the impact energy absorption section in a distributed manner from the deformation plate to the impact energy absorption section.

\* \* \* \* \*